United States Patent Office 3,501,987
Patented Mar. 24, 1970

3,501,987
PROCESS AND APPARATUS FOR THE CUTTING OR PUNCHING OF SECTIONS FROM PILES OF SHEETS
Willi Schneider, Adliswil, Zurich, Switzerland, assignor to Trey, Wiederkehr & Cie, Zurich, Switzerland
Original application Sept. 9, 1964, Ser. No. 395,262, now Patent No. 3,344,697. Divided and this application July 21, 1967, Ser. No. 695,294
Claims priority, application Switzerland, Nov. 8, 1963, 13,749/63
Int. Cl. B26d 7/04, 7/06
U.S. Cl. 83—125      7 Claims

ABSTRACT OF THE DISCLOSURE

Apparatus is provided to exert an adjustable pressure on a stack of sheets during a blanking operation to insure dimensional accuracy between the topmost and bottommost blanks. A pressure member having the same contour as the blank to be punched is movably mounted within a hollow die and an adjustable pressure is exerted on the member by a fluid-actuated drive means.

---

This application is a division of application Ser. No. 395,262, filed Sept. 9, 1964, now Patent No. 3,344,697.

The present invention relates to processes and apparatus for the cutting or punching of sections or blanks from piles or stacks of paper, plastic sheets, textiles and the like.

If a large number of blanks is to be produced simultaneously from a pile or stack of sheets by one cutting operation, differences will result in dimensional accuracy between the topmost and bottommost blanks.

It is an object of the invention to avoid this disadvantage.

According to the invention this object is accomplished by providing an adjustable pressure or compression which is exerted on the pile to be processed, prior to and during the cutting operation. This measure will insure dimensional accuracy from the topmost to the bottommost blank.

The present invention also proposes an apparatus for carrying out the process according to the invention, wherein a punch having the same contour as the blank is movably arranged inside the punching tool and is operable by driving means through which an adjustable pressure is exerted on the punch.

An embodiment for carrying out the process according to the invention is illustrated in the accompanying drawing, in which.

Figure 1:
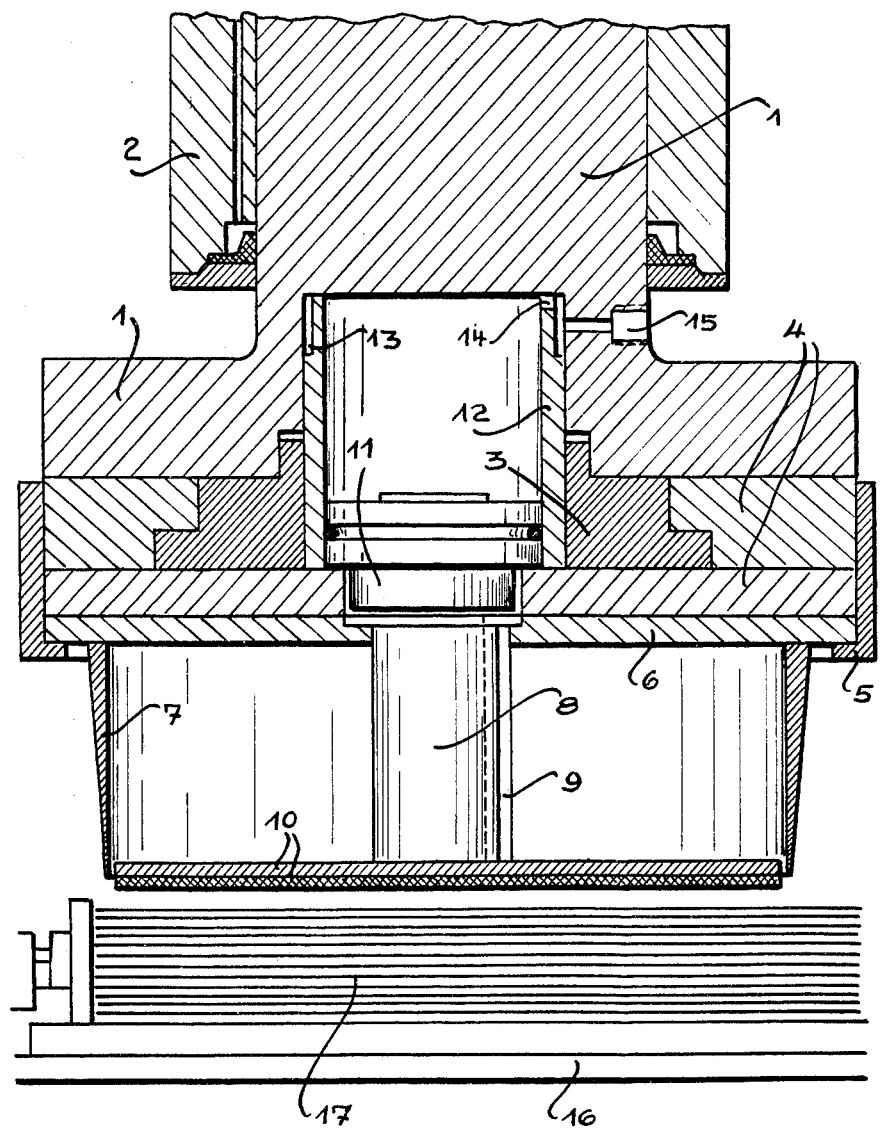
FIGURE 1 shows a vertical section through the apparatus.

Referring to FIG. 1, element 1 is a hydraulic piston or plunger which is vertically movable in a cylinder 2 and which is acted on by springs (not shown) which tend to move said plunger into its upper limit position. The plunger 1 can be moved downwardly by a pressure fluid entering the cylinder 2 from the top (see FIG. 2).

Fixed to the bottom of the plunger 1 is a holding or supporting ring 3, on which a base plate 4 is rotatably positioned, said base plate being provided with a support 5 into which a knife support 6 is inserted, on which a knife 7 is fixed. Suspended in the center of the knife support 6 is a punch 8, a wedge 9 preventing rotation of the punch 8 in relation to the knife support 6. Fixed to the bottom of the punch 8 is a punch plate 10 which carries an elastic covering 10a on the underside.

The members 6–10 form a unit which can be inserted as such into the support or mounting 5. Upon the insertion of said unit, the punch 8 is coupled to a piston 11 which is freely movable in a cylinder 12. The cylinder 12 is seated in a central bore at the bottom end of the plunger 1 and it comprises on the outside at the top a shoulder 12a by which is formed an annular space or chamber 13 which is connected to the inner chamber 13a of the cylinder by a passage 14. A duct 15 leads outwardly through cylinder 2 from the annular chamber 13. A compressed-air line described hereinafter is connected to said duct.

FIG. 1 also shows a pile or stack of paper sheets 17 on a table top 16, the blanks being cut or punched from said pile of paper by means of the knife 7.

Figure 2:
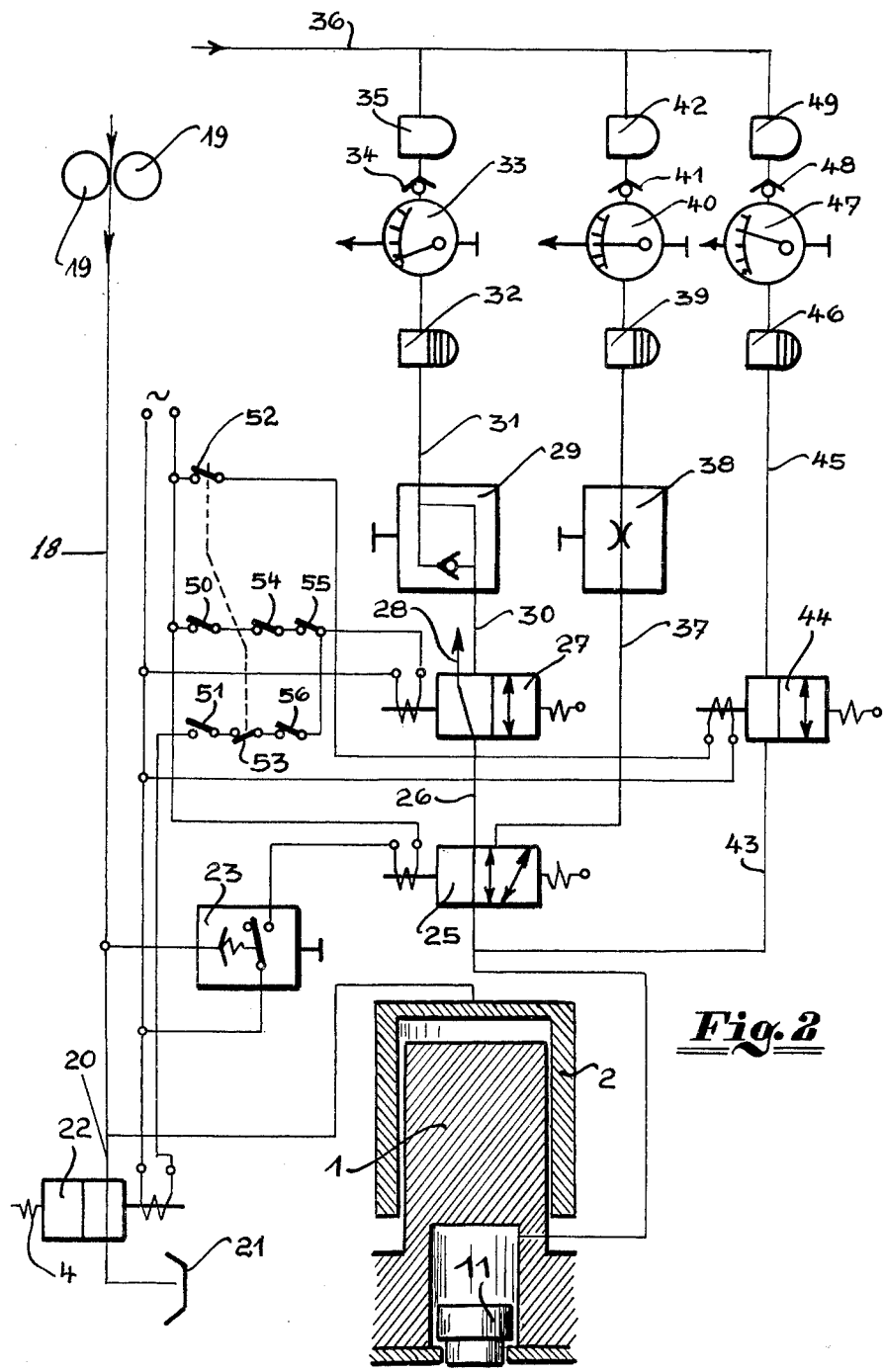
FIGURE 2 is a diagrammatic representation of the control mechanism of the apparatus.

As appears in FIG. 2, the cylinder 2 is connected to a hydraulic pump 19 by way of a line 18, while a magnetic valve 22 is connected into a line or piping 20 which leads to a sump or pit 21. A regulatable push button switch 23 is also connected to the line 18.

A compressed-air line 24 leading to a magnetic valve 25 is connected to the duct 15 (FIG. 1) communicating with the cylinder 12. A line 26 leads from the magnetic valve 25 to a magnetic valve 27 to which is connected a line 28 leading to the outside and a line 30 leading to a regulating member 29. From the regulating member 29 a line 31 leads, by way of a lubricator device 32, a pressure-reducing valve 33 with relief or check-valve 34 and by way of a filter 35, to a compressed-air feed line 36.

In addition, a line 37 leads from the magnetic valve 25, by way of a throttle member 38, a lubricator device 39, a pressure-reducing valve 40 with a check-valve 41 and by way of a filter 42 to the compressed-air feed line 36.

Another line 43 connects the line 24 to a magnetic valve 44, from which a line 45 leads, by way of a lubricator device 46, a pressure-reducing valve 47 with check-valve 48 and by way of a filter 49, to the compressed-air feed line 36.

The contact of switch 23 and the magnetic coils of the magnetic valves 22, 25, 27 and 44 are connected to a control source of alternating current by way of contacts 50, 51, 52, 53, 54, 55, 56.

The above-described device operates in the following manner:

Upon switching on the press, the contact 50 is closed. The contacts 54, 55 are closed when the base plate 4 is in operating position. The coil of the magnetic valve 27 is excited when contacts 50, 54, 55 are closed, and said valve is reversed so that compressed air flows from the line 36 by way of the filter 35, the check-valve 34, the pressure-reducing valve 33, the lubricator 32, the control valve 29, the magnetic valve 27, the magnetic valve 25, the duct 15, the annular chamber 13 and the passage 14 into the cylinder 12 and forces the piston 11 and the punch 8 downward.

When the table and the carriage of the press have terminated their motions, the contact 51 closes and the magnetic valve 22 is reversed, so that pressure fluid is pressed by the pump 19 through the line 18 into the cylinder 2, and the plunger 1 moves downward.

During this process, the punch plate 10, the contour of which corresponds to that of the blank to be punched, first impinges on the pile 17 and compresses said pile with a preliminary pressure adjustable by the pressure-reducing valve 33. This has the effect that the air within the pile is forced out, thereby insuring that all layers are in accurately level position when the knife impinges on the pile.

When the knife 7 impinges on the pile 17 the liquid pressure in the line 18 increases and the contact of the switch 23 is closed. By way of this contact, the coil of the magnetic valve 25 is excited and said valve 25 is reversed so that the compressed air is conducted from the line 36 (and instead of via the pressure-reducing valve 33 and the control valve 29) into the cylinder 12 by way of the pressure-reducing valve 40 and the throttle member 38 and that thereby another, lower or higher, pressure acts on the pile 17 through the punch plate 10 during the cutting process. Said pressure may be decreased, increased or kept constant during the cutting process, i.e., it can be adjusted as is necessary for accurately cutting the pile from the topmost to the bottommost layer.

For example, if it results that the blanks become constantly smaller from the top to the bottom layer of the pile, the pressure during the cutting process will be increased correspondingly. This will prevent an undercutting, i.e., an inward deflection of the knife.

As soon as the knife 7 has cut through the entire pile 17, the contacts 52 and 53 are reversed by the plunger 1. The coil of the magnetic valve 44 is then excited by way of the closed contact 52, and said valve is reversed, so that a pressure is now produced by way of the pressure-reducing valve 47 in the cylinder 12, which is required for the subsequent expulsion of the blanks. The opening of the contact 53 switches off the magnetic valve 22, so that the pressure fluid flows from the line 18 into the sump 21 and the piston 1 is relieved from pressure and is returned by spring force as aforesaid. Since this causes the pressure in the line 18 to be lowered, the switch 23 switches off and the magnetic valve 25 returns to the starting position, while the magnetic valve 27 remains switched on, so that the lines 24, 26 and 30 are connected to each other, the check valve in the control member 29 making it possible for an increased pressure to occur in the cylinder 12 by way of the pressure-reducing valve 47. Upon the return motion of the piston 1, said pressure will expel the blanks from the knife 7. The plunger can now be moved to another place, and the operation can be repeated.

As already described, the above-described apparatus comprises three different pressure stages which are switched on and off by the magnetic valves 25, 27 and 44. There may also be less pressure stages. For example, if no special pressure stage is required for the expulsion, the stage in question, i.e., the magnetic valve 44 and the pressure-reducing valve 47, may be dispensed with. It is sometimes possible to operate with a single regulable pressure stage, in which case the control mechanism could be further simplified by omitting the press switch 23, the magnetic valve 25 and the associated pressure-reducing valve 40 and the throttle member 38.

Instead of feeding compressed air to the cylinder 12 for actuating the piston 11, a pressure fluid may be fed to the cylinder. For example, the piston 1 may be provided with a thin calibrated central bore, through which pressure fluid flows from the cylinder 2 into the cylinder 12 and an outlet may be connected to the duct 15, to which outlet may be connected one, two or three control or safety magnetic valves which can be controlled in the same manner as the magnetic valves shown in FIG. 2.

Instead of being actuated by means of the piston 11 put under pressure by compressed air or a pressure fluid, the punch 8 may also be actuated by an electromagnet, in which case the adjustable pressure, possibly adjustable at two or three stages, exerted on the punch plate 10, can be set by changing the voltage applied to the magnet.

What is claimed is:

1. Apparatus for cutting sections out of a stack of sheets, said apparatus comprising a source of pressure fluid, a first cylinder, a piston in said cylinder, cutting means on said piston, first connection means connecting said cylinder to said source whereby to displace the piston and drive the cutting means through said stack, a second cylinder supported on said piston, a second piston in said second cylinder, means for engaging said stack mounted on said second piston, and second connection means connecting the secod cylinder to said source, said second connection means comprising at least two parallel sets of pressure adjustment means and valve means in series connection between said source and second cylinder, a first of said valve means being effective with said cutting means withdrawn from said stack to couple said source and second cylinder via the related pressure adjustment means and a second of said valve means being responsive to engagement of said cutting means with said stack to couple said source and second cylinder via the related pressure adjustment means whereby the various cutting steps may be accomplished by varied pressures exerted on said stack.

2. Apparatus for cutting sections out of a stack of sheets, said apparatus comprising means to support said stack, a source of pressure fluid, a first cylinder, a piston in said cylinder, cutting means, support means mounting said cutting means on said piston, first connection means connecting said cylinder to said source whereby to displace the piston and drive the cutting means through said stack, a second cylinder supported on said piston, a second piston in said second cylinder, a plate having a contour corresponding to that of said cutting means mounted on said second piston to be displaceable along the cutting means, an elastic facing on said plate for engaging said stack, and second connection means connecting the second cylinder to said source, said second connection means comprising at least two parallel sets of pressure adjustment means and valve means in series connection between said source and second cylinder, a first of said valve means being effective with said cutting means withdrawn from said stack to couple said source and second cylinder via the related pressure adjustment means, a second of said valve means being coupled to said first connection means and being responsive to a pressure change in the latter, due to engagement of said cutting means with said stack, to couple said source and second cylinder via the related pressure adjustment means.

3. Apparatus for cutting sections out of a stack of sheets, said apparatus comprising means to support said stack, first and second sources of pressure fluid, a first cylinder, a piston in said cylinder, a knife, support means mounting said knife on said piston, first connection means connecting said cylinder to said first source whereby to displace the piston and drive the knife through said stack, a second cylinder supported on said piston, a second piston in said second cylinder, a plate having a contour corresponding to that of said knife mounted on said second piston to be displaceable along the knife, an elastic facing on said plate for engaging said stack, and second connection means connecting the second cylinder to said second source, said second connection means comprising at least one set of pressure adjustment means and valve means in series connection between said second source and cylinder, said valve means being responsive to completion of the travel of said knife through the stack to couple said second source and cylinder via the related pressure adjustment means.

4. Apparatus for cutting sections out of a stack of sheets, said apparatus comprising means to support said stack, first and second sources of pressure fluid, a first cylinder, a piston in said cylinder, a knife, support means mounting said knife on said piston, first connection means connecting said cylinder to said first source whereby to displace the piston and drive the knife through said stack, a second cylinder supported on said piston, a second piston in said second cylinder, a plate having a contour corresponding to that of said knife mounted on said second piston to be displaceable along the knife, an elastic facing on said plate for engaging said stack, and second connection means connecting the second cylinder to said second source, said second connection means comprising at least one set of pressure adjustment means and valve means in series connection between said second source and cylinder, said valve means being coupled to said first connection means and being responsive to a pressure change in the latter, due to engagement of said knife with said stack, to couple said second source and cylinder via the related pressure adjustment means.

5. Apparatus for cutting sections out of a stack of sheets, said apparatus comprising means to support said stack, first and second sources of pressure fluid, a first cylinder, a piston in said cylinder, a knife, support means mounting said knife on said piston, first connection means connecting said cylinder to said first source whereby to displace the piston and drive the knife through said stack, a second cylinder supported on said piston, a second piston in said second cylinder, a plate having a contour corresponding to that of said knife mounted on said second piston to be displaceable along the knife, an elastic facing on said plate for engaging said stack, and second connection means connecting the second cylinder to said second source, said second connection means comprising at least one set of pressure adjustment means and valve means in series connection between said second source and cylinder, said valve means being effective with said knife withdrawn from said stack to couple said second source and cylinder via the related pressure adjustment means.

6. Apparatus for cutting sections out of a stack of sheets, said apparatus comprising means to support said stack, first and second sources of pressure fluid, a first cylinder, a piston in said cylinder, a knife, support means mounting said knife on said piston, first connection means connecting said cylinder to said first source whereby to displace the piston and drive the knife through said stack, a second cylinder supported on said piston, a second piston in said second cylinder, a plate having a contour corresponding to that of said knife mounted on said second piston to be displaceable along the knife, an elastic facing on said plate for engaging said stack, and second connection means connecting the second cylinder to said second source, said second connection means comprising at least two parallel sets of pressure adjustment means and valve means in series connection between said second source and cylinder, a first of said valve means being effective with said knife withdrawn from said stack to couple said second source and cylinder via the related pressure adjustment means and the other of said valve means being coupled to said first connection means and being responsive to a pressure change in the latter, due to engagement of said knife with said stack, to couple said second source and cylinder via the related pressure adjustment means.

7. Apparatus for cutting sections out of a stack of sheets, said apparatus comprising means to support said stack, first and second sources of pressure fluid, a first cylinder, a piston in said cylinder, a knife, support means mounting said knife on said piston, first connection means connecting said cylinder to said first source whereby to displace the piston and drive the knife through said stack, a second cylinder supported on said piston, a second piston in said second cylinder, a plate having a contour corresponding to that of said knife mounted on said second piston to be displaceable along the knife, an elastic facing on said plate for engaging said stack, and second connection means connecting the second cylinder to said second source, said second connection means comprising three parallel sets of pressure adjustment means and valve means in series connection between said second source and cylinder, a first of said valve means being effective with said knife withdrawn from said stack to couple said second source and cylinder via the related pressure adjustment means, a second of said valve means being coupled to said first connection means and being responsive to a pressure change in the latter, due to engagement of said knife with said stack, to couple said second source and cylinder via the related pressure adjustment means, a third of said valve means being responsive to completion of the travel of said knife through the stack to couple said second source and cylinder via the related pressure adjustment means whereby the various cutting steps may be accompanied by varied pressures exerted on said stack.

References Cited

UNITED STATES PATENTS

| 2,649,153 | 8/1953 | Barley | 83—380 |
| 2,667,922 | 2/1954 | Hill et al. | 83—380 |
| 2,776,540 | 1/1957 | Kraujalis | 83—400 X |
| 3,107,567 | 10/1963 | Lindner | 83—380 X |
| 2,579,940 | 12/1951 | Lobrovich | 83—137 X |

JAMES M. MEISTER, Primary Examiner

U.S. Cl. X.R.

83—137, 176, 380, 290